United States Patent
Heine-Kempkens et al.

(10) Patent No.: US 7,564,627 B2
(45) Date of Patent: Jul. 21, 2009

(54) STRUCTURED OPTICAL ELEMENT AND PRODUCTION THEREOF

(75) Inventors: Claus Heine-Kempkens, Chur (CH); Othmar Züger, Triesen Fürstentum (LI); Michael Hunziker, Rapperswil (CH)

(73) Assignee: Oerlikon Trading AG, Trubbach, Trubbach (CH)

( * ) Notice: Subject to any disclaimer, the term of this patent is extended or adjusted under 35 U.S.C. 154(b) by 0 days.

(21) Appl. No.: 10/133,122

(22) Filed: Apr. 26, 2002

(65) Prior Publication Data

US 2003/0133209 A1    Jul. 17, 2003

(30) Foreign Application Priority Data

Jan. 11, 2002    (DE) ............... 102 00 872

(51) Int. Cl.
*G02B 1/10*    (2006.01)
*G02B 5/28*    (2006.01)

(52) U.S. Cl. ............... 359/582; 359/587; 359/590

(58) Field of Classification Search .......... 359/885, 359/887, 892, 891, 890, 589, 587, 590, 580, 359/586; 216/24; 427/162, 164; 430/7

See application file for complete search history.

(56) References Cited

U.S. PATENT DOCUMENTS

| | | | | | |
|---|---|---|---|---|---|
| 4,029,394 | A | * | 6/1977 | Araki | ............... 359/587 |
| 4,355,866 | A | * | 10/1982 | Tanaka et al. | ............... 359/586 |
| 4,580,159 | A | * | 4/1986 | Manabe | ............... 348/273 |
| 4,876,167 | A | * | 10/1989 | Snow et al. | ............... 430/7 |
| 5,073,008 | A | * | 12/1991 | Terashita et al. | ............... 359/589 |
| 5,164,858 | A | * | 11/1992 | Aguilera et al. | ............... 359/587 |
| 6,238,583 | B1 | * | 5/2001 | Edllinger et al. | ............... 216/24 |

FOREIGN PATENT DOCUMENTS

DE    19641303    4/1997

* cited by examiner

*Primary Examiner*—Audrey Y Chang
(74) *Attorney, Agent, or Firm*—Price, Heneveld, Cooper, DeWitt & Litton, LLP

(57) ABSTRACT

An optical element structured in accordance with the invention comprises a substrate with at least two zones with different optical functions. The coating systems in the two zones can in each case be subdivided into a zone-specific internal partial coating system and a complementary partial coating system that is common to all the zones, where the complementary partial coating system comprises at least one layer and in the zones in which the internal partial coating systems comprises at least one layer said coating system is arranged between the substrate and the complementary partial coating system.

2 Claims, 1 Drawing Sheet

STRUCTURED OPTICAL ELEMENT AND PRODUCTION THEREOF

The present invention concerns a structured optical element and a procedure for producing a structured optical element.

The structured optical element could be—for example—a structured color filter for use in monolithic color disks. These are important components for the projection of color images. As here used, monolithic is to be understood as meaning that the surface of at least one substrate is provided with a structured coating, and this in such a way that the different zones of the surface of this one substrate are provided with different function layers, so that the locally delimited surface of the substrate will possess at least two clearly defined optical functions. Monolithic color disks must therefore be distinguished from segmented color disks. In the latter case two or more substrates, each of which has its entire surface provided with just a single function layer, are arranged to constitute a color disk.

On the other hand, structuring the surface of a substrate renders possible the selection of structure sizes in the micrometer (μm) range and even smaller. Such micro-structured optical elements nowadays find extensive application in projection technology, a case in point being when light has to be made to arrive at an image-producing element (light valve) in such a way that adjacent pixels will be struck by light of different wavelength ranges.

What is achieved by means of the structuring is that the light, depending on the particular zone in which it strikes the surface, will be reflected, transmitted, absorbed, refracted or scattered in some other way according to the particular function layer it meets in its passage. What is essential is that several zones should be realized on a single substrate. In this connection, nevertheless, a zone need not necessarily constitute a continuous area, but may also consist of a multitude of non-connected areas. The realization of several zones avoids the need for arranging several substrates adjacent to each other.

As is well known from the prior art, such structured coatings can be produced by means of a combination of surface coating and a lithographic lift-off process of the kind described, for example, by Sperger et al. in U.S. Pat. No. 6,238,583. The substrates are first cleaned. Thereafter the photosensitive resist is applied, masked, exposed and developed. This is followed by the application of the first coating for the first structures. The photosensitive resist, together with the coating lying on top of it, is then removed by means of a wet-chemical dissolution process. The coating will therefore remain only in those locations that were masked at the time the photosensitive resist was applied, so that the coating was applied directly to the substrate. The substrate is then cleaned for the application of the next coating system. This process is repeated for all the different function layers that are needed. If the structured optical surface is to comprise zones that are to do nothing other than transmit the light, i.e. zones in which a neutral function layer is to be realized, it will generally be necessary to realize a reflection-reducing coating in these zones, a so-called anti-reflex coating (AR coating). In this connection care has to be taken to assure that only the previously uncoated zone of the substrate will be provided with the AR coating, for whenever such a coating is superposed on the function layers of the other zones without appropriate precautions, it will generally interfere with their optical characteristics. The previously described masking process therefore becomes necessary also for the application of such AR coatings.

Such processes are costly and as a general rule are associated with yields well below 100%. The fact that all these processes are coupled proves to be particularly disadvantageous. To this one has to add the fact that the coatings are exposed to environmental influences at the edges of the zones.

DE 19641303 A1 describes a procedure in which a structured optical element is produced by first applying an etch prevention layer to cover the entire optical surface to which the function layer is subsequently to be applied and structured. As regards the zones in which a neutral element is needed, attention is explicitly drawn to the fact that the etch prevention layer, at least when it consists of magnesium fluoride, also acts as reflection-reducing layer. Attention is further drawn to the fact that the design of the function layers can make due allowance for the optical effects of the etch prevention layer. This can take the place of the structuring step necessary for the neutral zones.

Magnesium fluoride is however a coating material that, especially when additional function layers have to be applied, can lead to such cosmetical problems as layer cracking. Other coating materials are generally used for the actual function layers and with the help of lift-off process it becomes possible to do without an etch prevention layer in most cases. In particular, there are many applications for which the single magnesium fluoride layer will not possess sufficient reflection-reducing properties. It is therefore only logical to forego the use of magnesium fluoride.

A further drawback of these known processes consists of the fact that the lift-off technique will dissolve a considerably part of the coating. This renders the coating itself inefficient and costly.

Of course, one can always try to apply an anti-reflex coating with traditional materials prior to the structuring. It is however found in practice that such a coating system makes it difficult to adapt to the other function layers, because such a coating would have to be adapted (matched) to the transition from the substrate to air and also from the substrate to the rest of the coating system. Furthermore, when this type of structuring is employed, the zone edges will be as exposed as they were before. As a general rule, therefore, such a filter will have only a limited resistance to environmental influences.

The present invention sets out to eliminate the disadvantages associated with the prior art. In particular, it sets itself the task of minimizing the processing steps needed for the production of the structured optical element and as far as possible to decouple them, so that it can be used for the production of structured optical elements of a high quality, especially as regards its optical and mechanical properties, and at a particularly favorable cost.

In accordance with the invention this aim is attained by proceeding as described hereinbelow. The dependent claims refer to other advantageous embodiments.

The procedure in accordance with the present invention always requires the coating systems of the zones with different optical functions to be subdivided into two partial coating systems, namely an internal partial coating system that differs from one zone to another and a complementary partial coating system that covers all the zones. In accordance with the invention, the internal partial coating systems are first applied to the different zones, said coating systems calling for a structuring process in each zone. Subsequently the complementary partial coating system is applied in a single step in all the zones without a structuring process. Consequently, the complementary partial coating system is at least a component of the coating systems of all the zones. In one of the zones it is therefore often possible to obtain the required optical function with a coating system that is identical with the complementary partial coating system. The first partial coating system does not therefore comprise any layer in this zone and, consequently, a structuring process will no longer be required for this zone. This possibility will come to the fore particularly whenever the substrate comprises a zone in which the light is to be efficiently transmitted through the substrate. In that case the complementary partial coating system will be designed as a reflection-reducing layer.

It is one of the essential characteristics of the present invention that the internal partial coating systems are arranged between the substrate and the complementary partial coating system. This means that the production process is such that all the structuring processes are completed before that all-covering complementary partial coating system is applied and cannot therefore exert any harmful influence on this system. Furthermore, thin-film design studies have quite surprisingly shown that such a common partial coating system can be realized more readily as a terminal coating than a common coating applied before the structuring. A particular advantage of this sequence is constituted by the fact that the finally applied coating system continuously covers the entire surface and thus provides also mechanical protection.

Such a procedure will also make it possible for all the structuring processes to be decoupled if one substrate of every zone with a non-neutral optical function is provided with the structured first partial coating system that corresponds to that particular zone. This decoupling means that the yields associated with the individual structuring processes will likewise be decoupled and the yield associated with the overall process will be considerably stepped up. Application of said first partial coating system is always followed by the application of a complementary partial coating system over the entire substrate, the complementary system being such that the zones that were not previously coated will have reflection-reducing properties. When the substrates are combined, matters are arranged in such a way that not more than one zone with a non-neutral optical function will lie in the optical path (except when it is desired to obtain the effect of the sum of two or more optical functions).

By way of example, the invention will now be illustrated and discussed with the help of schematic figures and examples.

Figure 1:
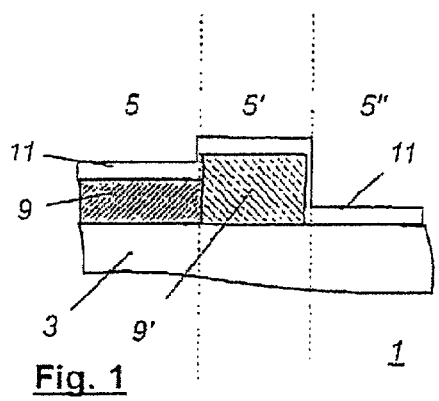
FIG. 1 is a cross section through an optical element in accordance with the invention with structured coatings on a substrate with three zones of different optical functions.

The first example is intended to describe the production of a structured optional element is illustrated by FIG. 1. It comprises just one substrate 3. Over and above this, the structured optical element 1 is to comprise a first zone 5 in which only blue light is transmitted. The element 1 is also to comprise a second zone 5' in which only green light is transmitted. A third zone 5" of element 1 is to transmit both blue and green light and reflect only red light. With a view to obtaining this result, one first determines a coating system that on being applied to the substrate 3 has the effect of reflecting red light and transmitting blue and green light. An appropriate coating system can be determined by using, for example, a thin-film-design optimization program. As a general rule and given a particular set of material characteristics, such an optimization program will be capable of optimizing the number of layers and the thickness distribution of a coating system in relation to a particular target function that corresponds to the desired spectral characteristics. Such software is well known to the average person skilled in the art and can be obtained through commercial channels (a software package name Optilayer being a case in point). The use of such a software is particularly appropriate in the case of the present filter concept. But partially analytical procedures may also be used when coating systems have to be determined. In any case, the coating system determined in this manner, which upon being applied to substrate 3 has the effect of reflecting red light and transmitting blue and green light, corresponds to the complementary partial coating system 11. This coating system is optimized for light with a vertical incidence. The next step is to determine a coating system that transmits blue light and reflects red and green light. One of the known optimization programs can once again be used for this purpose. The determination of this coating system is however subject to the boundary condition that is to contain a terminal coating system that is identical with the complementary partial coating system 11. The additional layers needed for this coating system, which are arranged between the substrate and the complementary partial coating system, correspond to the first internal partial coating system 9. A further step is dedicated to the determination of a coating system that will transmit only green light and reflects red and blue light, where the terminal layers are once again to be identical with the complementary partial coating system 11. The additional layers in this case corresponds to a second internal partial coating system 9'.

Following the determination of the design data, the substrate 3 is first covered with a layer of photosensitive resist. This layer is then masked, exposed and developed, so that eventually the substrate will be uncovered in zone 5, where only blue light is to be transmitted, while all the other zones will still be covered by the photosensitive layer. The substrate is then coated with the first internal partial coating system 9. Removal of the remaining photosensitive resist, complete with the layer that have been deposited on top of it, will then assure that the first internal partial coating system 9 – as desired – remains in being only in zone 5.

The next step again consists of the application of a photosensitive layer, which is then masked, exposed and developed, so that eventually the substrate 3 will be uncovered solely and exclusively in the second zone 5', which is to transmit only green light. The second internal partial coating system 9' corresponding to this second zone 5' is then applied. Removal of the residual photosensitive resist, complete with the layers deposited on top of it, will then assure that the further partial coating system 9' remains only in zone 5, as desired. Up to this step none of the zones of the substrate have been provided with the desired optical function. This is obtained only after a further processing step in which the complementary partial coating system 11 is applied to the entire substrate 3. This not only completes the coating systems of zones 5 and 5', which are to transmit, respectively, only blue light or green light, but also provides an as yet wholly uncovered zone 5" of substrate 3 with a coating system that will reflect only red light and transmit both blue and green light.

One structuring process has thus been saved. To this one has to add the fact that only partial coating systems have to be removed, so that the overall coating process becomes more efficient.

Figure 2:
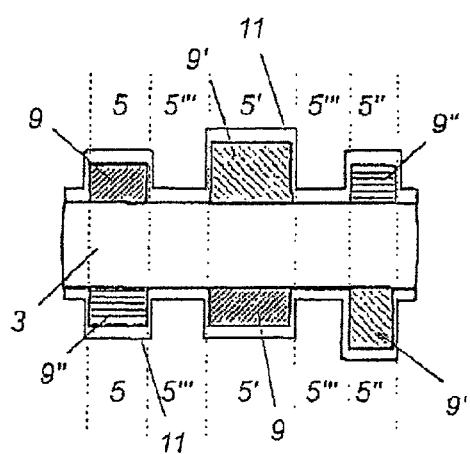
FIG. 2 is a cross section through a structured optical element in which both Sides of the substrate have been provided with structured coatings in accordance with FIG. 1 and the optical function in each of the zones is always the sum of the optical functions on the two sides of the substrate.

The second example describes the production of a structured optical element comprising four zone 5, 5', 5" and 5'". Such an element is shown in FIG. 2. The first zone 5 transmits nothing but blue light, the second zone 5' transmits green light and the third zone 5" transmits red light, while the fourth zone 5'" transmits the entire visible spectrum. Among others, such an optical element could be a color disk of the type used in projectors operating on the basis of sequential color division.

The production of such an element is again preceded by the determination of the necessary design of the coating systems. This time the first step consists of the determination of a coating system that will have a reflection-reducing effect when it is applied to the substrate. This corresponds to the required optically neutral function of the fourth zone 5'". This coating system also constitutes the common complementary partial coating system 11 of the other zones. Thereafter one proceeds with the design of a coating system that reflects blue light and transmits red and green light. A further coating system is then designed to reflect green light and transmits blue and red light, followed by the determination of a third coating system to reflect red light and transmit blue and green light. All three systems are designed subject to the condition that the terminal layers are to correspond to the complementary partial coating system 11.

Once the design data have been determined, one begins by applying the layers that do not form part of the complementary partial coating system 11 of the various zones by means of appropriate coating and structuring processes, that is to say, the first internal partial coating system 9 is applied in the first zone, the second internal partial coating system 9' is applied in the second zone and the third internal partial coating system 9" is applied in the third zone. The complementary partial coating system 11 is then applied over the entire substrate 3 in a further processing step. One surface of the substrate 3 now comprises optically neutral zones and zones that always reflect one of the colors red, blue or green. An analogous procedure is then followed on the rear side of substrate 3, though care must be taken to -ensure that the coating systems situated opposite to each other will always be such that either both will be optically neutral, i.e. transmit the entire visible spectrum, or that both will not be optically neutral, but do not reflect the same color. For example, the second internal partial coating system 9' may be applied in the first zone 5, the third internal partial coating system 9" in the second zone 5' and the first internal partial coating system 9 in the third zone 5", after which the complementary partial coating system 11 will be applied over the entire area. This creates an element with zones that possess the required optical functions. It is assumed that the light will strike the substrate surface in a vertical direction. It is also assumed that the surrounding medium is air and that the substrate has a refraction index of n=1.5. It is likewise assumed that high-refraction material has a refraction index of $n_H$=2.4, while low-refraction material has a refraction index of $n_L$=1.48. The high-refraction material could be titanium oxide, while the low-refraction material could be silicon dioxide.

Figure 3:
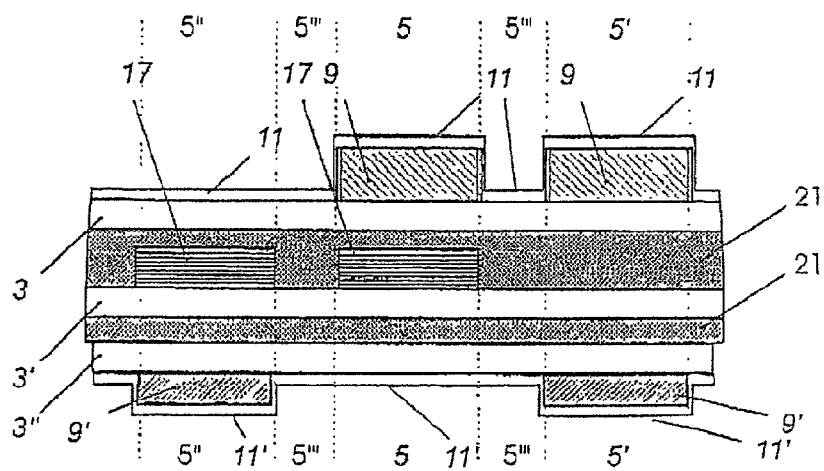
FIG. 3 is a cross section through an opitical element consisting of three substrates structured on one side only.

The third example is intended to describe how the structuring processes necessary for the production of a color disk can be completely decoupled by means of a procedure in accordance with the present invention. This is possible on the basis of three substrates 3, 3' and 3", though in this case the rear sides of the substrates do not have to be coated. A schematic representation of this element is shown in FIG. 3. The first step is again constituted by the determination of the necessary coating designs. The following designs are needed in this case: reflection-reducing coatings that can also be used as complementary partial coating systems (11, 11'); a first internal partial coating system 9 that, together with the complementary partial coating system 11, will reflect blue light; a second internal partial coating system 9' that, together with the further complementary partial coating system 11, will reflect red light; and a coating system 17 that reflect nothing but green light, though in this case the design must take account of the fact that the incidence medium will not be constituted by air, but probably by an optical adhesive. In accordance with the invention, the first internal partial coating system 9 is then applied to the areas 5 and 5' of a substrate 3 in which blue light is to be reflected. Thereafter the substrate surface with its structured coatings is coated with the previously determined complementary partial coating system 11, so that the coated surface of substrate 3 will now reflect blue light in zones 5 and 5', whereas in all other zones it will transmit almost the entire visible spectrum.

The coating system reflecting green light is then applied to the zones 5 and 5" of a further substrate 3' in which green light is to be reflected.

In accordance with the invention, the second internal partial coating system is then applied in the zones 5' and 5" on one side of yet another substrate 3" in which red light is to be reflected. The coating is applied on the side of substrate 3" that in the sequence of substrates 3, 3' and 3" occupies the outermost position, i.e. constitutes the boundary between the element and the air. The surface of substrate 3" with its structured coatings is then coated with the previously determined further complementary partial coating system 11', so that the coated surface of substrate 3" will now reflect red light in zones 5' and 5" and transmit almost the entire visible spectrum in all the other zones.

This sequence of steps produces a substrate with zones 5 and 5' that reflect blue light, a substrate with zones 5' and 5" that reflect red light and a substrate with zones 5" and 5 that reflect green light. The three substrates are then optically bonded with, for example, an optical adhesive 21. When this is done, the substrates are arranged in such a manner that the side that carries the blue-reflecting coating system constitutes one of the terminals of the element in contact with the air and the side that carries the red-reflecting coating system constitutes the other terminal thereof. The geometry of the zones of the substrates covered with reflecting coating systems is chosen in such a manner that when the substrates are superposed on each other, the light beam to be transmitted in any zone will always have to pass through two different color filters. Only red light will thus be transmitted in the first zone 5, only green light will be transmitted in the second zone 5', and only blue light will be transmitted in the third zone 5". One may also realize a fourth zone 5'" in which the entire visible spectrum is transmitted, that is to say, the light merely passes through the complementary partial coating system 11 and the further complementary partial coating system 11' as it, respectively, enters and leaves the element.

It should be noted that all the structuring processes are decoupled in the above procedures and that none of the rear sides of the substrates had to be coated.

The invention has here been illustrated and discussed with the help of solely three different embodiments. Variants of these embodiments are, of course, possible and even obvious. For example, the procedure can be used to produce not only color disks, but also color drums, which are essentially glass tubes provided with structured color filters. Such color drums are likewise used in projectors. Concrete ways of carrying out the coating system design have been given in the case of two of the examples. In this connection it should however be borne in mind that other materials known in thin-film technology can be considered when selecting the coating materials, just as other layer thickness structures can be realized and used in accordance with the invention. In particular, thin-film systems can also consist of layers that are not delimited by clearly defined boundary surfaces, but which are rather characterized, to give but one example, by a gradual transition of the refraction index from one layer to the adjacent one.

As compared with the prior art methods, the invention thus attains the advantage of saving a structuring process in the production of structured optical elements. In accordance with the invention, the complementary partial coating systems extend over more than one zone. This means that the overall coating process becomes more efficient and that the structured element becomes both mechanically and chemically more stable, especially at the edges of the structuring zones.

As already explained, one embodiment of the invention makes possible the decoupling of the structuring processes and therefore also the decoupling of the yield of the individual processes, so that the economic aspects of the production process are considerably improved.

The invention claimed is:

1. A structured optical element containing a substrate of which the surface comprises a first zone and a second zone and the first zone contains a first coating system with an optical function consisting of a first internal partial coating system and a complementary partial coating system, where said first internal partial coating system comprises at least one layer and does not extend over the second zone and said complementary partial coating system comprises at least one layer and extends over the first zone and the second zone and where said complementary partial coating system is, in said second zone, at least part of a second coating system with an optical function that differs from the optical function of said first coating system, where said first internal partial coating system is arranged between said substrate and said complementary partial coating system and said surface of said substrate in said first zone with said first coating system constitutes a first optical filter that is associated with a first wavelength range consisting of one or more wavelength intervals and said surface of said substrate in said second zone with said second coating system constitutes a second optical filter that is associated with a second wavelength range consisting of one or more wavelength intervals and different from said first wavelength range of said first optical filter and said surface of said substrate comprises at least one further zone with at least one further coating system that constitutes at least one further optical filter that is associated with a further wavelength range consisting of one or more wavelength intervals, where one of said wavelength ranges comprises the entire spectrum of visible light and each of the optical filters substantially transmits or reflects light of the wavelength range associated with it and, vice versa, reflects or transmits light of any wavelength range not associated with it, wherein said first zone, said second zone and said further zone are different zones, characterized in that said complementary partial coating system is applied in a single step in all zones without a structuring process and that on said surface of said substrate in at least one of said zones said complementary partial coating system is arranged directly and as only coating system on the substrate and there constitutes a reflection-reducing coating system and that each of said zones is provided with its optical function not until said complementary partial coating system is applied.

2. The structured optical element of claim 1, wherein each said optical filter is a color filter.

* * * * *

UNITED STATES PATENT AND TRADEMARK OFFICE
CERTIFICATE OF CORRECTION

PATENT NO. : 7,564,627 B2  Page 1 of 1
APPLICATION NO. : 10/133122
DATED : July 21, 2009
INVENTOR(S) : Heine-Kempkens et al.

It is certified that error appears in the above-identified patent and that said Letters Patent is hereby corrected as shown below:

Col. 2, line 13: after "as" insert --a--;

Col. 2, line 29: "considerably" should be --considerable--;

Col. 3, line 47: "Sides" should be --sides--;

Col. 3, line 54: "optional element is" should be --optical element as--;

Col. 4, line 29: "corresponds" should he --correspond--;

Col. 4, line 38: "layer" should be --layers--;

Col. 4, line 40: Delete "in being" after "remains";

Col. 4, line 65: "zone" should be --zones--;

Col. 5, line 34: "to –ensure" should be --to ensure--;

Col. 6, line 1: "reflect" should be --reflects--.

Signed and Sealed this

Twenty-third Day of February, 2010

David J. Kappos
*Director of the United States Patent and Trademark Office*